UNITED STATES PATENT OFFICE.

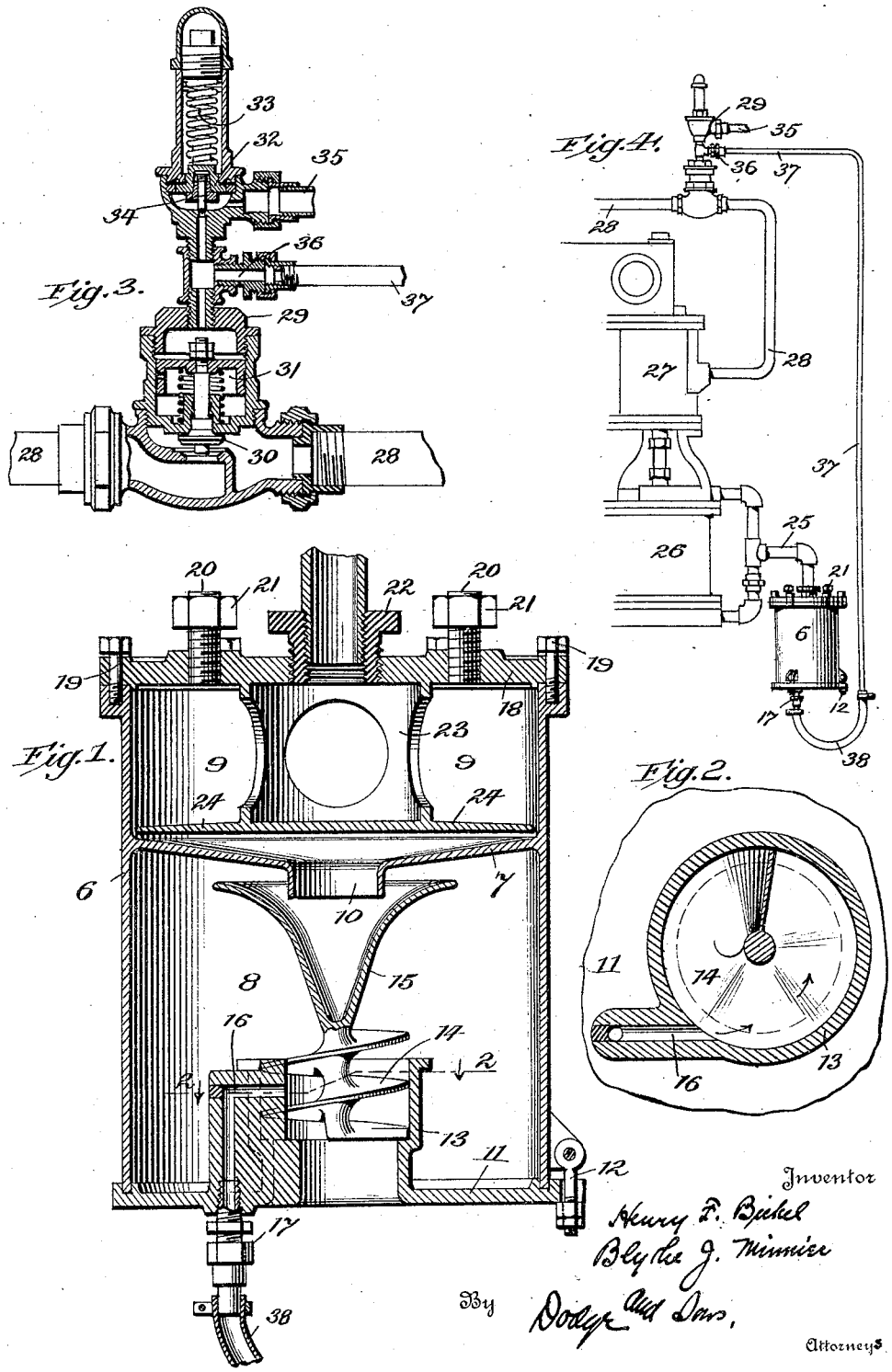

HENRY F. BICKEL, OF PLAINFIELD, NEW JERSEY, AND BLYTHE J. MINNIER, OF WATERTOWN, NEW YORK.

DUST COLLECTOR.

1,420,954.  Specification of Letters Patent.  Patented June 27, 1922.

Application filed October 28, 1921. Serial No. 511,008.

*To all whom it may concern:*

Be it known that we, HENRY F. BICKEL and BLYTHE J. MINNIER, citizens of the United States, residing, respectively, at Plainfield, in the county of Union and State of New Jersey, and at Watertown, in the county of Jefferson and State of New York, have invented certain new and useful Improvements in Dust Collectors, of which the following is a specification.

This invention relates to centrifugal dust collectors for use with air compressors, and particularly to the arrangement of an improved collector in combination with the air pump and pump governor of a railway air brake system, in such manner that air heretofore wasted at the governor is used to clean or partially clean the collector.

The preferred embodiment of the invention is shown in the accompanying drawing, in which:—

Figure 1 is a vertical section of the collector, the principal plane of section passing through the axis of the device. The tangential inlet for cleaning air is, however, shown in section on a plane forward of the main plane of section, as will appear from an inspection of Fig. 2.

Fig. 2 is a section on the line 2—2 of Fig. 1, on a slightly enlarged scale.

Fig. 3 is a vertical section of a standard air pump governor modified in accordance with the present invention.

Fig. 4 is a diagram of the pump, pump governor, dust collector and their connections with each other.

The body of the dust collector consists of a cylindrical shell 6 divided by a frusto-conical partition or baffle 7 into a lower chamber 8 and an upper and smaller chamber 9. The baffle 7 is downwardly inclined toward a central aperture whose margin is surrounded by a downward extending rim or flange 10.

The lower end of shell 6 is closed by a head 11 which is removably held by bolts 12 and which is provided with a central air admission port defined by a tubular inward extension 13. This is integral with head 11 and extends upward within chamber 8. It is thus surrounded by an annular pocket, which, being below the path of air flowing through chamber 8 serves to collect and retain dust precipitated from the air current. Mounted in tubular extension 13 is a spiral baffle 14 whose form is clearly shown in the drawing. The baffle 14 is surmounted by an upward and outward flaring conoidal cup-shaped baffle 15 whose upward margin is above the lower margin of flange 10 and relatively close to the lower face of baffle 7.

Formed in the walls of extension 13 is a tangential air port 16, which receives compressed air through a nipple 17 and delivers it into the admission port defined by extension 13 in such manner as to produce a whirling flow over the surface of spiral baffle 14. This action takes place only when the compressor is shut down, as will be further explained, and is for the purpose of cleaning baffle 14.

The upper end of shell 6 is closed by head 18, which is held by studs and nuts 19 or in any equivalent manner. The studs 20 and nuts 21 serve as means for mounting the entire structure. The bushing 22 is the connection for the intake pipe of the air compressor.

Surrounding the intake connection and formed integrally with head 18 is an apertured cylindrical baffle 23 which carries at its lower end a horizontal disk or plate baffle 24 spaced a short distance above baffle 7. The periphery of this baffle 24 is quite close to the interior of shell 6 and the baffles 7 and 24 thus co-act to cause the air to flow outward in a stream of ever-diminishing thickness, and then after an abrupt change of direction, to issue into chamber 9 in an annular stream which though thin is of such large circumference as to flow at relatively low velocity.

The dust collector is connected up with the pump and pump governor as shown in Fig. 4. The bushing 22 receives the intake or suction pipe 25 of compressor 26 which is driven by steam cylinder 27 in the usual manner. The steam pipe 28 leading to cylinder 27 carries a pump governor 29 which is standard in all respects except one.

The governor 29 (see Fig. 3) includes the usual steam valve 30, steam-valve actuating piston 31, diaphragm 32, governor spring 33, and diaphragm valve 34. The connection to the main reservoir is shown at 35.

Instead of the usual restricted atmospheric vent located between valve 34 and piston 31 we provide a choke nipple 36 to which is connected a pipe 37. Pipe 37 is connected through a flexible hose 38 with nipple 17.

The operation of the governor is essentially unchanged. When main reservoir pressure, acting on diaphragm 32, opens valve 34 against the opposition of the governor spring 33, main reservoir air is admitted above piston 31 faster than it can escape through choke nipple 36. Hence piston 31 moves downward and closes steam valve 30, thus shutting down the pump. Air continues to flow through nipple 36 so long as the pump remains out of action, and this air escaping at tangential port 16 acts to clean baffle 14. When main reservoir pressure drops sufficiently spring 33 will close valve 34. Since choke nipple 36 vents the space above piston 31 valve 30 immediately opens putting the air pump into action, and flow through port 16 almost immediately ceases.

The air drawn by the pump flows through the separator, entering through the air admission port 13 in the bottom and flowing out from the top through pipe 25. As it passes in through port 13 the spiral baffle 14 imparts a whirling motion which persists as the air flows through chamber 8. This causes dust particles to flow by centrifugal force toward or against the cylindrical wall of chamber 8, and thus causes these particles to settle out of the air current and accumulate in the annular pocket surrounding port 13 in the bottom of chamber 8. The flaring cup 15 assists in directing the whirling flow outward and its upward edge defines the lower margin of an annular passage through which an inward and downward air-flow occurs. The momentum of such solid particles as may still remain in suspension tends to carry them to the bottom of cup 15 where they will collect.

The air next flows upward through port 10, then outward between baffles 7 and 24, up around the periphery of baffle 24 and through the ports in baffle 23 to pipe 25. These baffles with large areas presented to the air current, and low velocities of air flow assist in the settling out and arresting of small dust particles. The device thus presents a series of dust separating and collecting instrumentalities the first depending on a whirling or vortex action and the others on sudden changes of direction in a slow-flowing current.

An important feature of the design is that the area of each air passage in the dust collector is greater than the cross sectional area of pipe 25 so that the velocity of air flow throughout the collector is lower than the velocity of flow in pipe 25. This is favorable to efficient dust removal and avoids the imposition of undue load on the pump.

The device may be cleaned from time to time by removing the lower head 11, and the connected cup 15.

What is claimed is:—

1. The combination of an air pump; a dust-collecting device connected with the intake of said pump; a pump governor connected with said pump to start and stop the same and having a vent which discharges air as an incident to the governing function; and a connection between said vent and the collector serving to discharge the vented air within the collector to perform a cleaning function.

2. The combination of an air pump; a dust-collecting device connected with the intake of said pump and including a series of dust collecting instrumentalities; a pump governor connected with said pump to start and stop the same and having a vent which discharges air while the pump is stopped by the governor; and a connection from said vent to the first dust collecting instrumentality of said series, serving to discharge said vented air through said instrumentality to perform a cleaning function, while the pump is stopped.

3. The combination of an air pump; a dust-collecting device connected with the intake of said pump and including a circular chamber and a baffle serving to direct air into said chamber with a whirling motion; a pump governor connected with said pump to start and stop the same and having a vent which discharges air while the pump is stopped by the governor; and a connection from said vent serving to direct said discharged air across said baffle to clean the same.

4. In a dust collector, the combination of a substantially vertical cylindrical shell having an axial entrance aperture at its lower end; a baffle serving to impart a whirling motion to the entering air; an upward and outward flaring cup-shaped baffle within said shell; a centrally apertured partition extending across said shell and having a flange surrounding its central aperture and projecting downward below the upper margin of said cup-shaped baffle; and a discharge connection from said shell above said centrally apertured partition.

5. In a dust collector, the combination of a substantially vertical cylindrical shell having an axial entrance aperture at its lower end; a baffle serving to impart a whirling motion to the entering air; an upward and outward flaring cup-shaped baffle within said shell; a centrally apertured partition extending across said shell and having a flange surrounding its central aperture and projecting downward below the upper margin of said cup-shaped baffle; a second baffle extending across said shell immediately above said partition, there being a passage around the peripheral edge of said second baffle; and a discharge connection from said shell above said second baffle.

In testimony whereof we have signed our names to this specification.

HENRY F. BICKEL.
BLYTHE J. MINNIER.